UNITED STATES PATENT OFFICE.

CHARLES H. SCHLABACH, OF CANTON, OHIO, ASSIGNOR TO THE HYGIENIC PRODUCTS COMPANY, OF CANTON, OHIO, A CORPORATION OF OHIO.

CLEANING-POWDER.

1,124,664.      Specification of Letters Patent.      Patented Jan. 12, 1915.

No Drawing.      Application filed April 28, 1913. Serial No. 764,058.

*To all whom it may concern:*

Be it known that I, CHARLES H. SCHLABACH, a citizen of the United States, residing at Canton, in the county of Stark and State of Ohio, have invented certain new and useful Improvements in Cleaning-Powders, of which the following is a specification.

The invention relates to powders for cleaning and like purposes composed of or containing sodium bisulfate or other deliquescent or partly deliquescent materials; and the object of the invention is to preserve such a powder in a free and dry granular condition, and to prevent a caking or conglomeration of the same in cartons or other packages pending its use.

For use in a cleaning powder, sodium bisulfate is finely powdered or granulated and may be combined with a certain portion of kiln dried sodium chlorid, likewise powdered or granulated, thus forming a composition which can be readily and conveniently handled in a powdered form for cleaning purposes.

Sodium bisulfate, however, is of such a deliquescent character, that although it may not fully liquefy when exposed to the moisture of the atmosphere, it absorbs so much moisture from the atmosphere as to cause it to harden and cake; and sodium chlorid unless chemically pure, is also slightly deliquescent; so that when a preparation is composed of sodium bisulfate or of sodium bisulfate combined with sodium chlorid, it has been found practically impossible to preserve it in a granular free flowing condition for any length of time, in any form of carton or package suitable for economical commercial requirements.

This difficulty is avoided, and the object of the invention is attained, by mixing a relatively small portion of finely powdered silicate of magnesium, commonly known as talc or steatite, with the sodium bisulfate or with the sodium bisulfate and sodium chlorid composing the cleaning powder; thus forming a composition which remains dry under ordinary atmospheric conditions and is not injuriously affected by contact with the ordinary moisture of the atmosphere, it being understood that the presence of the powdered talc or steatite does not affect the proper action of the other ingredient or ingredients as a cleaning powder in the presence of water.

A preferred and efficient application of the invention is to make the cleaning powder of about seventy-five per cent. (75%) of finely powdered or granulated sodium bisulfate combined with some nineteen per cent. (19%) of likewise powdered or granulated kiln dried sodium chlorid, and then mixing therewith about six per cent. (6%) of finely powdered silicate of magnesium. In the composition thus formed, the finely powdered silicate of magnesium coats the granules of the other materials and also substantially fills the interstices between the same.

As the silicate of magnesium does not absorb moisture from the atmosphere and being inorganic is not decomposed by the acids of the other ingredients, and furthermore, as its presence does not affect the proper action of the other ingredients as a cleaning powder in the presence of water, it may properly be referred to as an inert powder or element in the composition as a whole. At any event, its presence serves to preserve the composition to such an extent that when contained in a suitable package, as for instance in a wooden carton or a metal can having seamed joints, the cleaning powder can be carried in stock on the shelves of a wholesale or retail merchant for many months without losing its original dry powdered or granular form, so that it can be poured as such from the package for use in cleaning.

It is not intended to limit the scope of the invention to the particular proportions of the ingredients set forth herein, nor to the use of the sodium chlorid in combination with the other elements; for it will be understood that the exact proportions of the ingredients may be modified to correspond to varying conditions, and that sodium bisulfate alone will be preserved by mixing with it the silicate of magnesium, without in either case, departing from the spirit of the invention.

I claim:—
1. A cleaning powder or the like, including a mixture of sodium bisulfate, sodium chlorid, and an inorganic inert powder.
2. A cleaning powder or the like, including a mixture of sodium bisulfate, sodium chlorid and powdered talc.
3. A cleaning powder including a mixture of sodium bisulfate and an inorganic inert powder.
4. A cleaning powder including a mixture of sodium bisulfate and powdered talc.

CHARLES H. SCHLABACH.

Witnesses:
 ELFRIEDE SCHMIDT,
 FERD J. ZETTLER.